(12) United States Patent
Neufeld

(10) Patent No.: US 7,152,360 B1
(45) Date of Patent: Dec. 26, 2006

(54) FISH HOOK SETTING DEVICE

(76) Inventor: Peter Neufeld, 2936 Dorchester Road, Niagara Falls, ON (CA) L2S 2Z5

( * ) Notice: Subject to any disclaimer, the term of this patent is extended or adjusted under 35 U.S.C. 154(b) by 0 days.

(21) Appl. No.: 11/238,215

(22) Filed: Sep. 30, 2005

(51) Int. Cl.
*A01K 91/10* (2006.01)

(52) U.S. Cl. ........................................................ 43/15
(58) Field of Classification Search ................ 43/15, 43/16
See application file for complete search history.

(56) References Cited

U.S. PATENT DOCUMENTS

| | | | | |
|---|---|---|---|---|
| 154,141 A | * | 8/1874 | Hill | 43/15 |
| 834,414 A | * | 10/1906 | Schmidt, Jr. | 43/16 |
| 975,822 A | * | 11/1910 | Becker et al. | 43/16 |
| 1,464,067 A | * | 9/1923 | Fantz | 43/15 |
| 1,516,484 A | * | 11/1924 | Meszaros | 43/16 |
| 1,747,033 A | * | 2/1930 | Shireman | 43/15 |
| 2,295,250 A | * | 9/1942 | Zenewich | 43/15 |
| 2,340,588 A | * | 2/1944 | Groves | 43/15 |
| 2,552,516 A | * | 5/1951 | Camp et al. | 43/15 |
| 2,567,340 A | * | 9/1951 | Lytle | 43/15 |
| 2,590,721 A | * | 3/1952 | Muth | 43/15 |
| 2,657,493 A | * | 11/1953 | Coles | 43/16 |
| 2,663,109 A | * | 12/1953 | Masi | 43/15 |
| 2,689,426 A | * | 9/1954 | Baenen | 43/15 |
| 2,696,692 A | * | 12/1954 | Zielinski | 43/15 |
| 2,797,516 A | * | 7/1957 | Suddarth | 43/15 |
| 2,841,912 A | * | 7/1958 | Eining | 43/15 |
| 3,172,224 A | * | 3/1965 | Parulski | 43/15 |
| 3,475,847 A | * | 11/1969 | Wilson | 43/15 |
| 3,771,250 A | | 11/1973 | Helmke | 43/15 |
| 3,852,905 A | * | 12/1974 | Webb | 43/15 |
| 3,889,413 A | * | 6/1975 | Snider et al. | 43/15 |
| 4,124,948 A | | 11/1978 | Mautner | 43/15 |
| 4,212,125 A | * | 7/1980 | Kim | 43/16 |
| 4,382,346 A | * | 5/1983 | Gardner | 43/15 |
| 4,924,617 A | * | 5/1990 | Parent | 43/15 |
| 4,944,106 A | * | 7/1990 | Wu et al. | 43/15 |
| 5,033,222 A | * | 7/1991 | Chang | 43/16 |
| 6,012,247 A | * | 1/2000 | Kinsey | 43/16 |
| 6,944,987 B1 | * | 9/2005 | Van Loef | 43/15 |

FOREIGN PATENT DOCUMENTS

FR 2599938 A1 * 12/1987
JP 8-56538 A * 3/1996

* cited by examiner

*Primary Examiner*—Darren W. Ark
(74) *Attorney, Agent, or Firm*—Edward H. Oldham

(57) ABSTRACT

A fish hook setting device is described in which a hook setting device is attached to a fishing line in such a manner that it may be actuated by a fish attempting to remove bait from the hook on a fishing line. The device allows the fishing line to slacken a little before snapping into the fish hook setting operation so that the chances of getting the fish hook "set" in the fish's mouth are good.

7 Claims, 5 Drawing Sheets

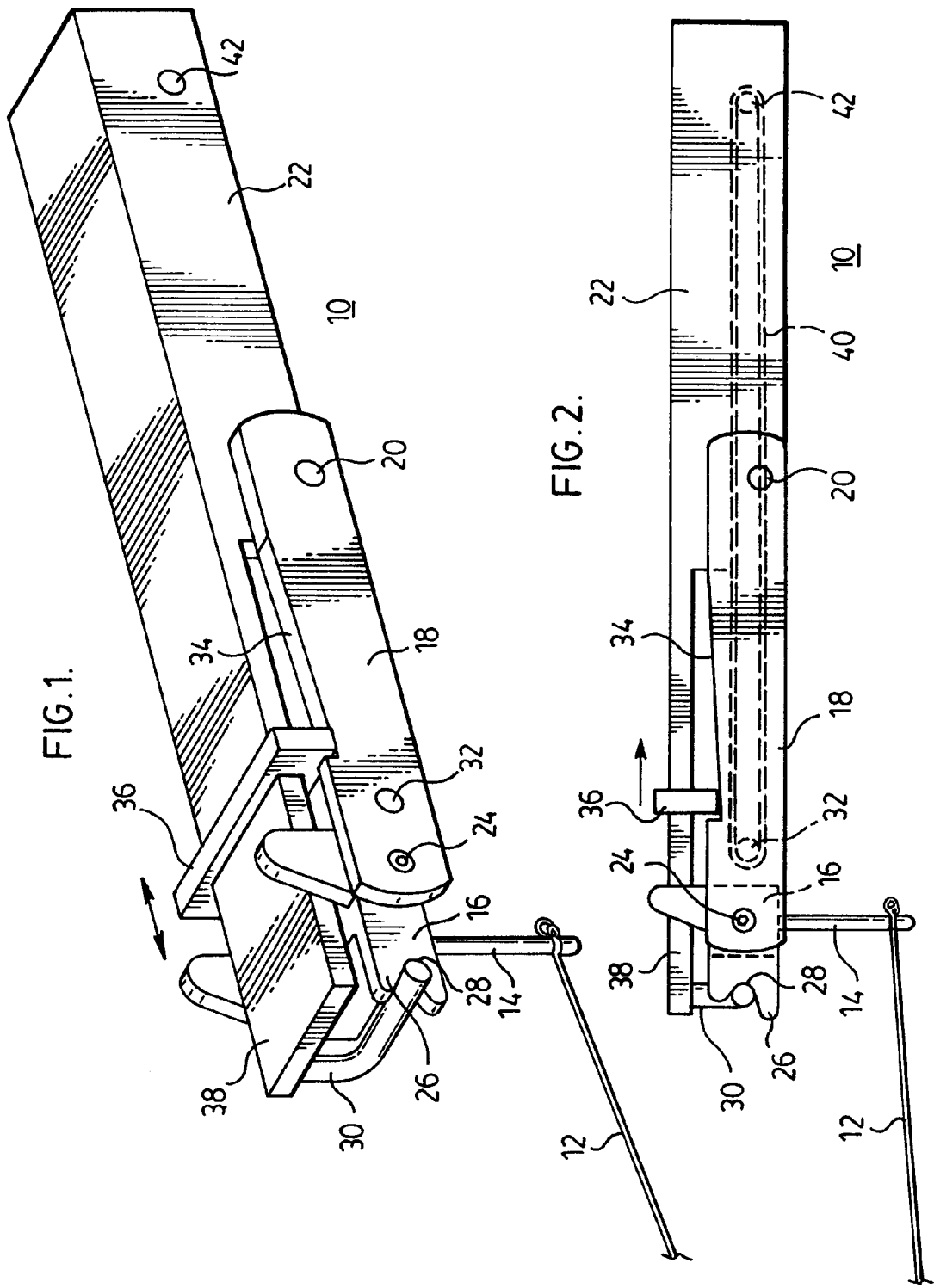

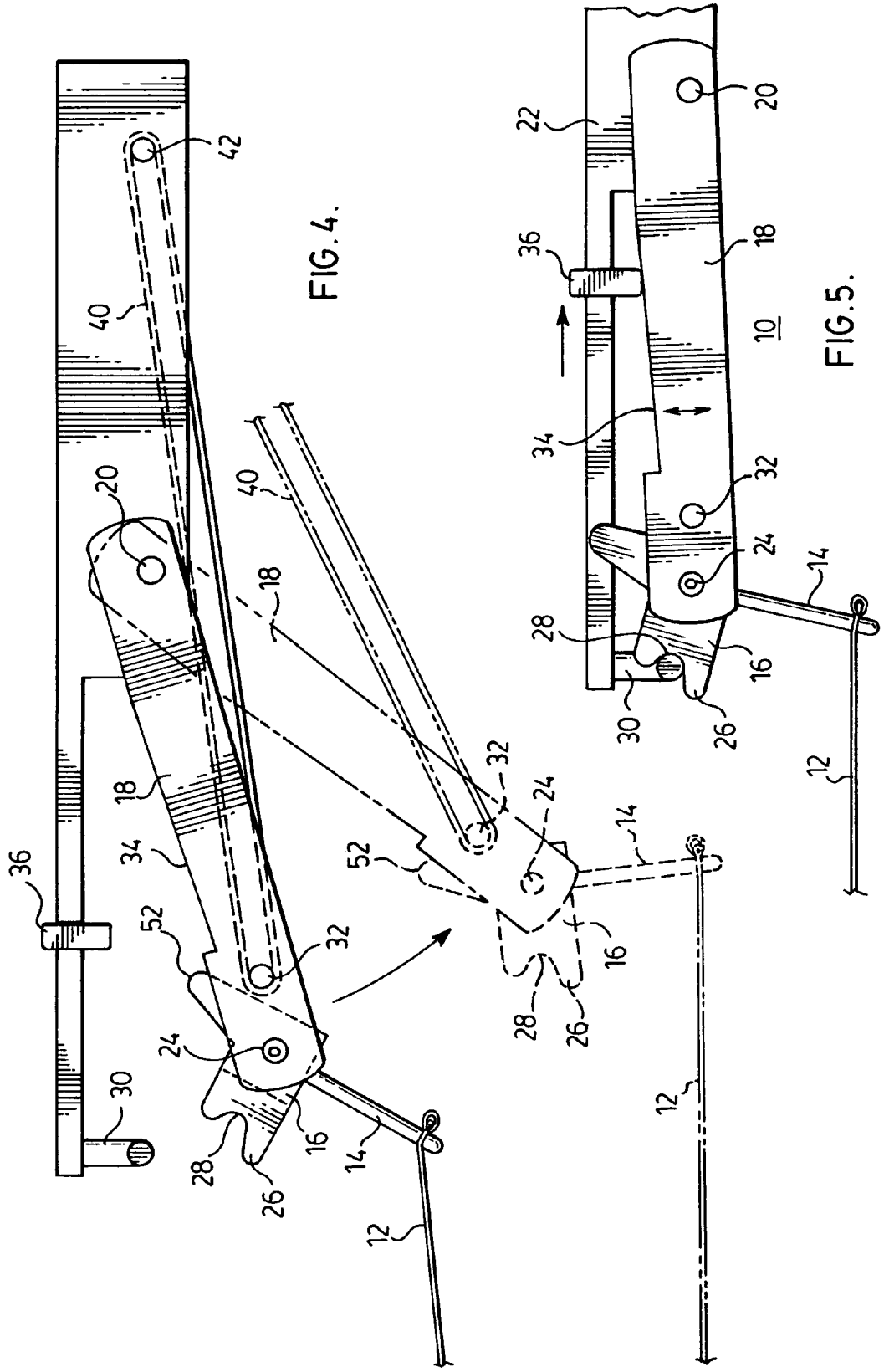

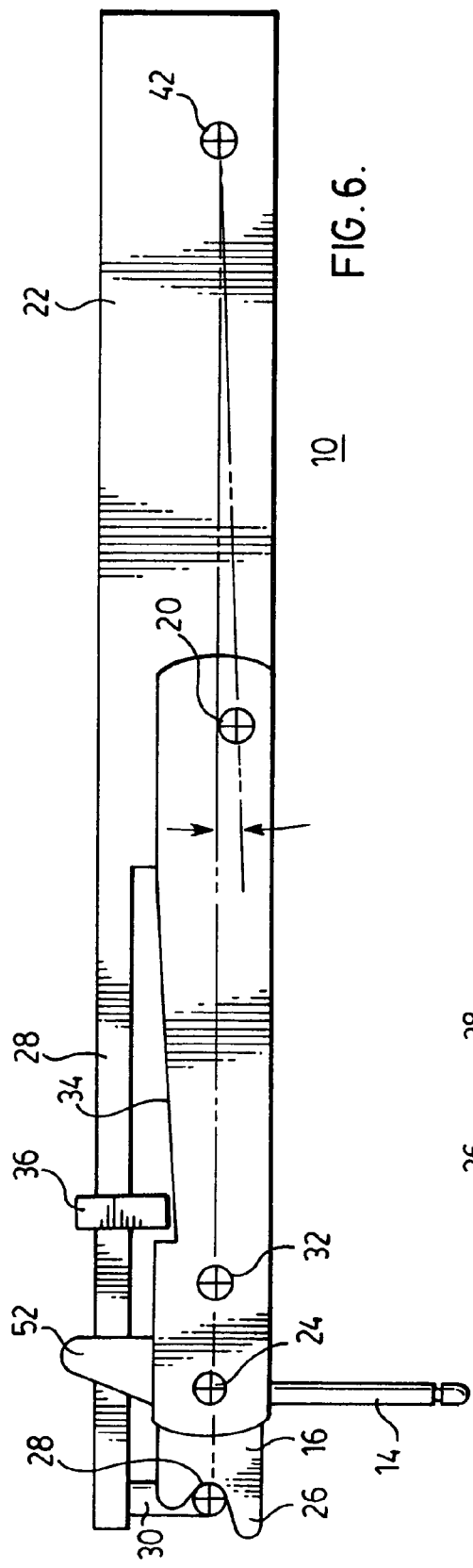
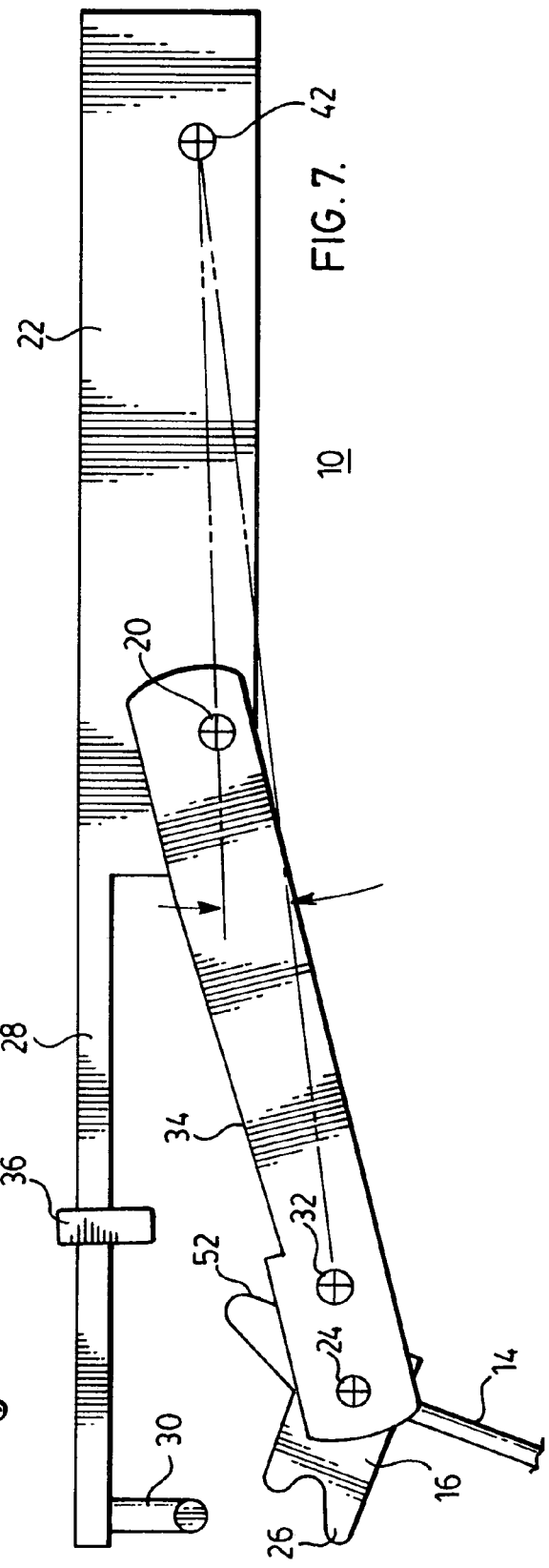

FISH HOOK SETTING DEVICE

BACKGROUND OF THE INVENTION

This invention relates to a fish actuated hook setting device. Fish have shown an uncanny ability to remove the bait from a fish hook before a fisherman realizes that a fish is removing the bait from the hook. It is all but impossible for a fisherman to remain diligent during long periods of time waiting for the fish to bite and it will be found that the previously baited hook has been stripped of its bait by one ore more fish before any action from the fisherman is initiated.

SUMMARY OF THE INVENTION

This invention relates to a fish hook setting device which is actuated by a fish. Thus an inattentive fisherman may have his hook "set" by the device of this invention. A fish attempting to remove bait from the hook will provide sufficient activation of this device to cause an overcentre toggle link to be actuated so that the fishing line is given a quick jerk thus setting the fish hook in the mouth of the fish attempting to remove the bait from the hook.

PERTINENT PRIOR ART

U.S. Pat. No. 5,033,222

This is a complex fish hook setting device which performs multiple functions. The fish hook setting device utilizes an elastic band to "jerk" the line to "set" the hook of the fishing line in the mouth of the fish.

U.S. Pat. No. 4,382,346

This fish hook setting device is mounted on a fishing pole so that an elastic band moves a captive "car" on a track to set the hook in the mouth of a fish.

U.S. Pat. No. 4,124,948

This patent uses a pin in an elbow of a "loaded" toggle to hold the elbow in the "loaded" position. The collapse of the toggle is accomplished by pin movement to release the elbow. The toggle collapse is driven by a pair of rubber bands.

U.S. Pat. No. 3,771,250

In this invention, an over center toggle is moved by a slight tug on the fishing line. This releases a lever which causes a "tug" on the line, setting the hook in the mouth of the fish which is attempting to take the bait.

BRIEF DESCRIPTION OF THE DRAWINGS

FIG. 1 is a perspective view of the device of this invention;

FIG. 2 is a side elevational view of the device of this invention;

FIG. 4 is a side elevational view of the device of FIG. 1 showing the orientation of various components during a tripping operation;

FIG. 5 is a partial elevational view showing the adjustment of the sensitivity of the device of FIG. 1;

FIGS. 6 and 7 are side elevational views of device 10 showing the position of the various parts in a tripping operation;

DESCRIPTION OF THE PREFERRED EMBODIMENT

Figure 3:
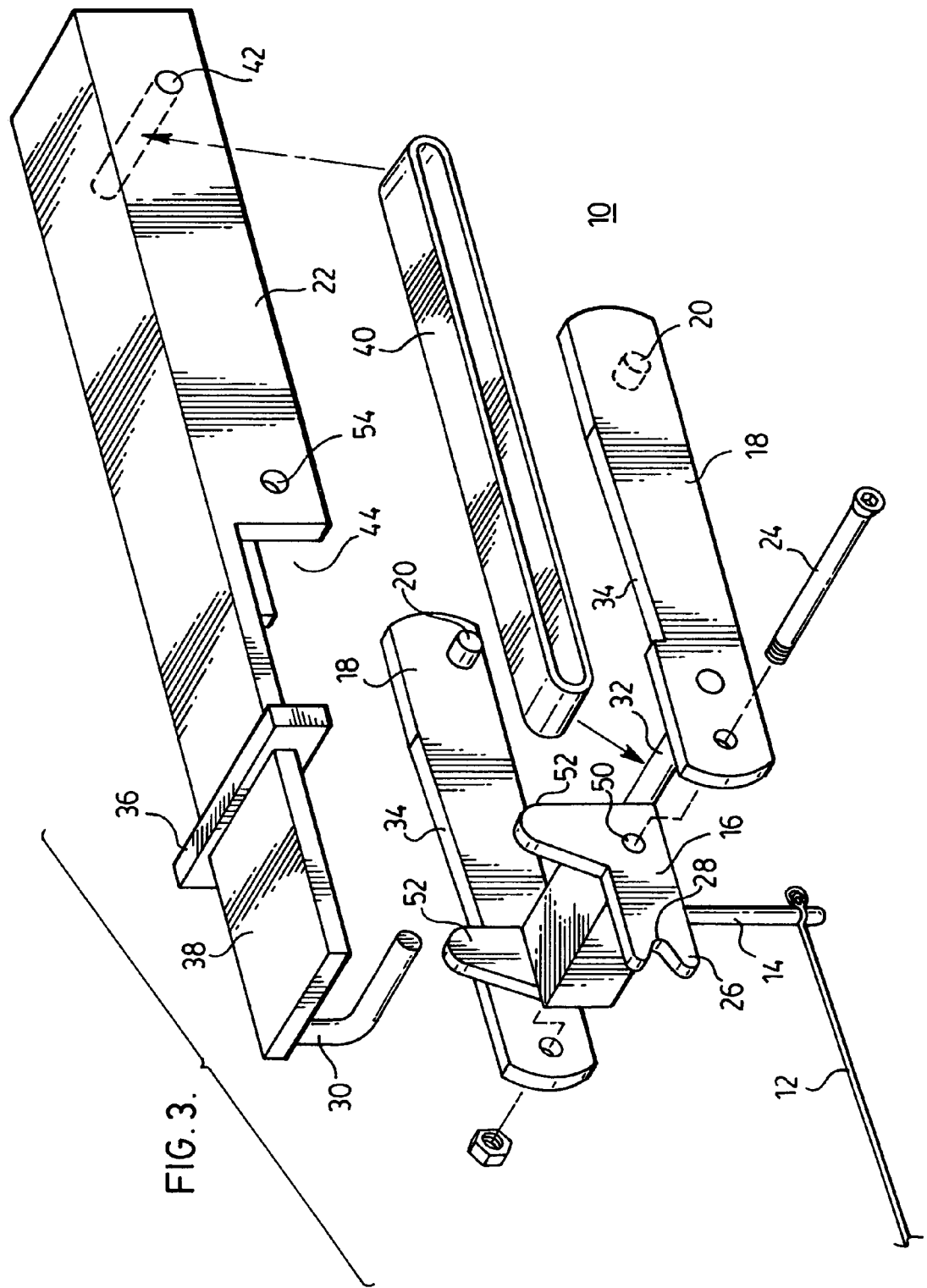
FIG. 3 is an exploded view of the device of FIG. 1.

FIG. 1 shows the fish hook setting device 10 which is "set" to provide a "jerk" on the line 12 upon suitable actuation. Line 12 is secured to an elongated pin 14 which is rigidly attached to toggle member 16. Toggle 16 is pivotably mounted between a pair of pivot arms 18 of which only one is shown in FIG. 1. Pivot arms 18 are mounted on pivot pins 20 so as to freely swing together at pins 20 (in an arc). Pins 20 are housed in bearing apertures 54 (see FIG. 3) in base member 22. Thus pivot arms 18 act as a unitary member upon actuation of device 10.

Toggle 16 is the latching device which "trips" when the fish hook on line 12 is pulled setting device of this invention. Toggle 16 is made to be rotatable about pin 24 (mounted in pivot arms 18) and is shown in the latched (or loaded) position in FIGS. 1 and 2. Toggle 16 is provided with projection 26 which houses a recess 28 shown engaging latch pin 30 (which is solidly attached to base 22).

The pivot arms 18 are securely held together by pin 32 so that both arms 18 must pivot together about pins 20. Arms 18 are provided at their upper surfaces with a ramp 34 which is engaged by a slide 36 in the "loaded" position. Slide 36 is made to have a frictional fit with the protrusion 38 of base member 22. Slide 36 is an adjustable stop which changes the sensitivity of the device 10 as it is moved from one location to another.

Referring now to FIG. 2, it will be seen that an elastic band 40 is stretched between pins 32 and 42. Pin 42 is provided within the recess shown as 44 in FIG. 3 in the body 22 specifically to provide a stationary anchor for elastic band 40.

Upon careful examination of FIG. 2 it will be noticed that elastic band 40 is stretched so that its center of "pull" is slightly above pin 20. This causes the pivot arms 18 to be urged in a clockwise manner against sliding stop 36 in the "loaded" position. In this position the toggle 16 is shown with recess 26 of projection 26 firmly engaging latch pin 30.

In the event of a "nibble" on bait which is applied to a hook (not shown) on line 12, the line will be pulled slightly to the left as shown in FIGS. 1 and 2 causing toggle 16 to rotate ever so slightly in a clockwise manner such that pivot arms 18 are forced to rotate in a counter clockwise manner. If the rotation of the toggle 16 is sufficient to cause the "center of pull" of band 40 to drop below the axis of pivots 20 the elastic band 40 will "snap" the pivot arms 18 into a programmed rotation about pins 20 to assume the final position (shown dotted) in FIG. 4.

FIG. 3 shows toggle 16 in an unobstructed manner. Toggle 16 is a unitary member having a clearance hole 50 provided therein (to permit toggle 16 to rotate about pivot 24) and a pair of projecting ears 52 which ultimately engage pin 32 at the position (shown dotted in FIG. 4). Clearance holes 54 are also provided in base 22 to permit pins 20 of arms 18 to freely rotate therein. Arms 18 are provided with "stops" (not shown) to limit the rotation of arms 18 in base 22 to that shown in FIG. 4 (dotted).

Referring to FIG. 4 specifically it will be seen that device 10 has now been "tripped". In the intermediate position, the arms 18 now have rotated in a counterclockwise manner away from stop 36. In this position the "fish" has managed to unlatch toggle 16 from pin 36, causing toggle 16 to rotate clockwise and drive pivot arms 18 in a counterclockwise direction.

Now elastic band is "enabled" because its "center of pull" is well below pivot 20. Arms 18 are now pulled to the ultimate position as shown dotted in FIG. 4.

Note that the projecting ears 52 of toggle 16 are shown engaging pin 32 so that line 12 is now pulled to the right to the final location and now has firmly set the hook (not shown) at the end of line 12 in the mouth of the fish that unlatched the toggle from latch pin 30. Arms 18 are provided with a suitable stop to limit the counterclockwise rotation of arms 18 about pins 20 located in holes 54 in base 22.

FIG. 5 shows how the adjustment of stop 36 may be used to adjust the "sensitivity" of device 10. In the position shown in FIG. 5 toggle 16 will require only a very slight tug on line 12 to set off the device 10. It will be found that device 10 in this state is almost unstable and may experience "nuisance" tripping.

FIGS. 6 and 7 show the "offcentredness" of the "line of pull" for the untripped device 10 (in FIG. 6) and the "tripped" position of device 10 as shown in FIG. 7. Note how the "line of pull" is moving away from pin 20 in FIG. 7 thus increasing the force on pin 14 to which line 12 is attached.

Figure 8:
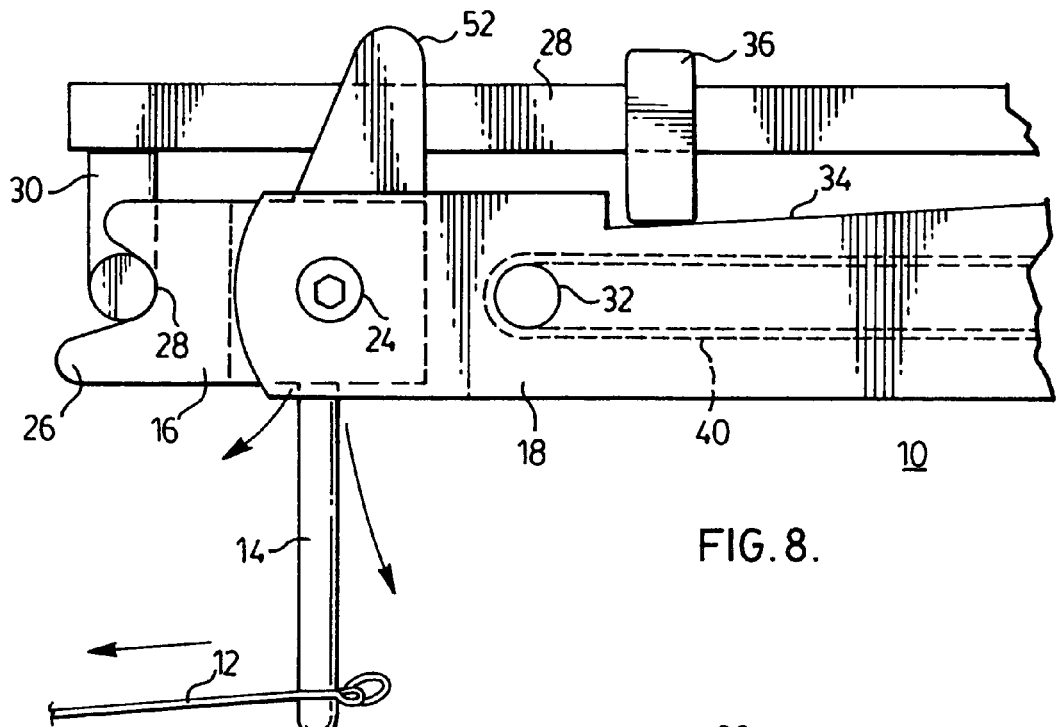
FIGS. 8 and 9 are enlargements of the tripping assembly shown during a tripping operation.
Figure 9:
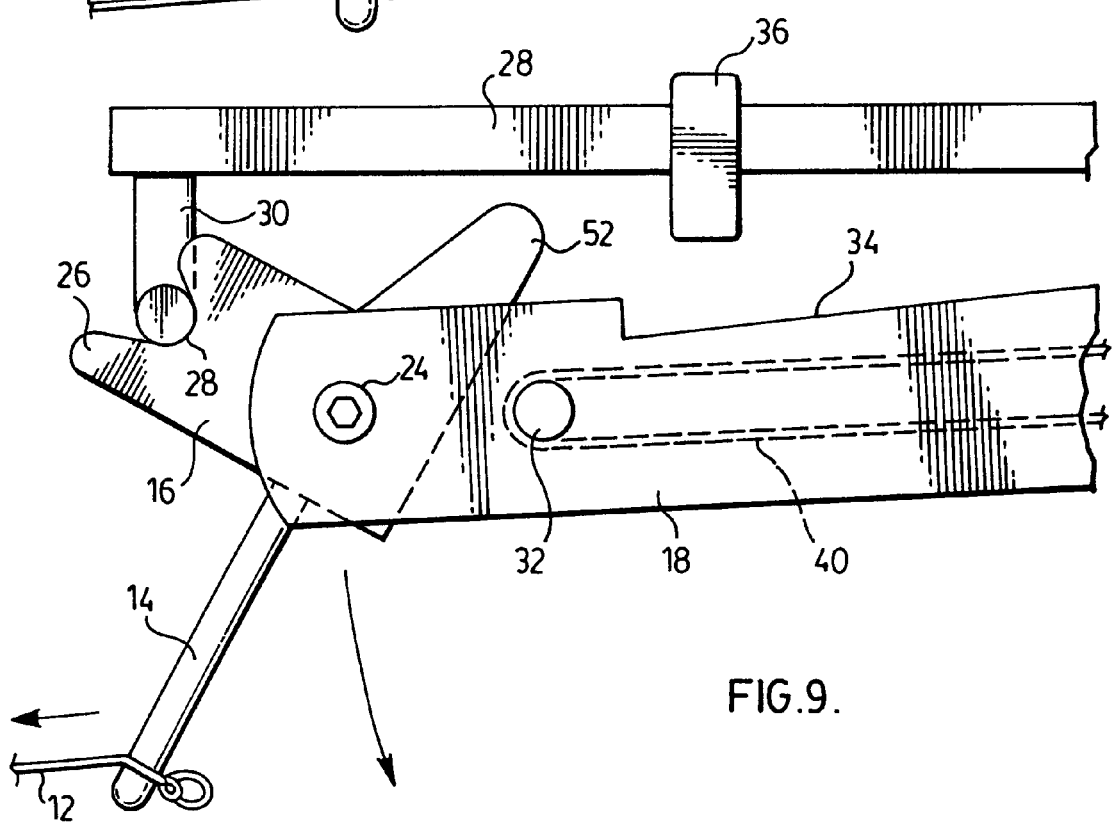

FIGS. 8 and 9 are enlargements of the toggle 16 and pin 30 showing the position of various elements during a tripping operation. It will be noted that upon the initial "tug" on line 12, that the apparatus 10 is designed so that line 12 is allowed to slacken as shown in FIG. 9 before device 10 pulls the line 12 in the direction as shown in the dotted illustration of FIG. 4. This action helps "set" the hook in the fish's mouth.

It will be noted that the device 10 has been illustrated to be fabricated from wood or plastic in the drawings attached hereto; it could be manufactured from sheet metal as well.

Sensitivity adjustment device 36 has been chosen to be easy to adjust as it slides along extension 38 of base 22. A threaded set screw could be used to adjust the rest position of pivot arms 18.

In the drawings, an elastic band is shown as the "stored energy" device. This could be replaced by a tension spring if desired.

The basic configuration of device 10 may well be used on a fishing pole. It will be noted that device 10 may be manufactured to be installed directly on the rod of a fishing pole.

What is claimed:

1. A fish hook setting device comprising:
   an elongated base member having a hollow interior, an anchor mounted near a first end of said base member, a pivot axis provided near the midpoint of said base member;
   a latching member mounted on said base member at a second end of said elongated base member,
   an elongated pivoting member mounted on said pivot axis of said base member, said elongated pivoting member comprising a pair of pivot arms mounted on said pivot axis and being connected together so as to rotate about said pivot axis together in concert;
   a second anchor mounted in said pivoting member near an end of said pivoting member remote from said pivot axis;
   a toggle member rotatably mounted between said pivot arms at the end of said pivoting member remote from said pivot axis;
   an elastic member both attached to and stretched between said anchors in such a manner that said elongated pivoting member and said base member form a loaded over center device about said pivot axis and latch said toggle member against said base member at a loaded position at rest;
   said toggle member having a latching capability with said latching member of said base member to fix said elongated pivoting member in a stationary latched position at rest;
   said toggle member having an arm extending therefrom for the attachment of a suitable fishing line carrying a fish hook thereon;
   said toggle member being caused to rotate in such a direction so as to unlatch said toggle member from said latched position upon the presence of a predetermined "tug" on said fishing line.

2. A fish hook setting device as claimed in claim 1 wherein said stretched elastic member provides energy to rotate said elongated pivoting member carrying said toggle member about said pivot axis from said latched position to a fish hook setting position once said toggle member becomes unlatched from said base member.

3. A fish hook setting device as claimed in claim 1 wherein said anchors are not collinear with said pivot axis at rest in the loaded position.

4. A fish hook setting device as claimed in claim 2 wherein said anchors and said pivot axis become collinear during an unlatching operation, and subsequently become "over center" as the unlatching operation continues.

5. A fish hook setting device as claimed in claim 1 wherein said base member carries a slider which adjusts the stationary latched position at rest of said elongated pivoting member.

6. A method of operating a fish hook setting device comprising:
   providing an elongated base member having a hollow portion at a first end thereof,
      said hollow portion having a first anchor mounted therein,
      a pivot axis located at a point near the middle of said elongated base member, and
      an extension for said base member extending from said pivot axis to a second end of said elongated base member remote from said first end of said elongated base member;
   providing an elongated pivoting member mounted on said elongated base member for pivoting on said pivot axis, said elongated pivoting member having a second anchor mounted near an end of said elongated pivoting member remote from said pivot axis, said elongated pivoting member comprising a pair of pivot arms mounted on said pivot axis and being connected together so as to rotate about said pivot axis together in concert;
   providing a toggle member rotatable mounted at the end of said elongated pivoting member remote from said pivot axis for engaging said extension of said elongated base member when in a loaded position, said toggle member fixing said elongated pivoting member in a stationary latched position at rest when said toggle member is engaged with said extension;
   attaching an elastic member to said anchors;
   stretching said elastic member between said anchors so that said anchors and said pivot axis form an over center loaded position at rest;
   attaching a fishing line to said toggle member so that when said line is jerked, said toggle member rotates to allow said pivot arms to move past said over center loaded position to a released position; and
   allowing said elastic member to rotate said elongated pivoting member about said pivot axis when said pivot arms are in the released position.

7. A method of operating a fish hook setting device as claimed in claim 6 wherein an adjustable stop member is provided at said extension for adjusting the stationary latched position at rest of said elongated pivoting member.

* * * * *